Figure 1:
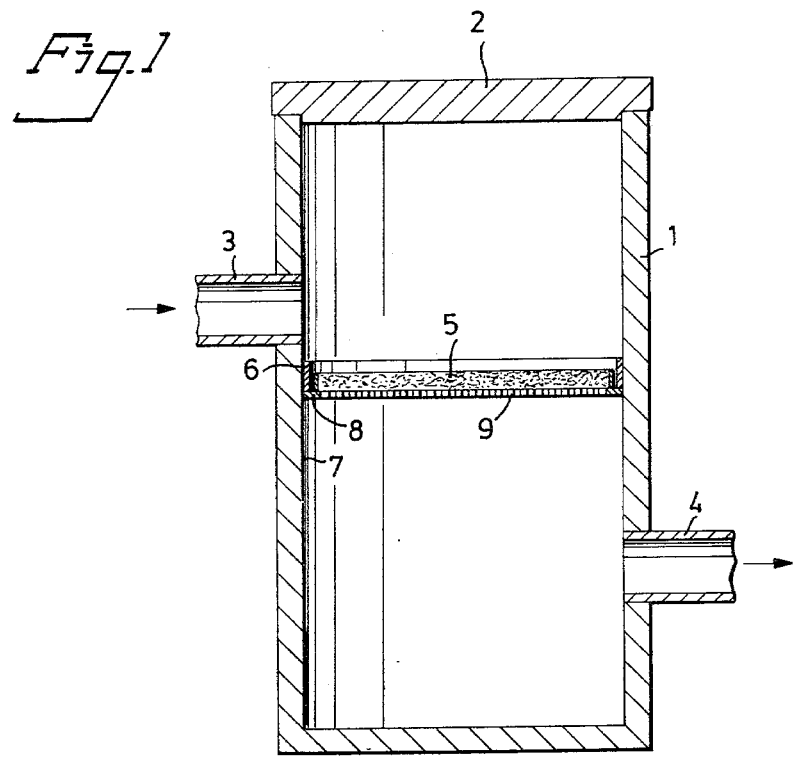

United States Patent [19]

Abrahamsson

[11] 4,274,960
[45] Jun. 23, 1981

[54] FILTER MEANS

[75] Inventor: Tage Abrahamsson, Skövde, Sweden

[73] Assignee: Metzeler AB, Tibro, Sweden

[21] Appl. No.: 97,888

[22] Filed: Nov. 26, 1979

Related U.S. Application Data

[63] Continuation of Ser. No. 13,533, Feb. 21, 1979, abandoned, which is a continuation of Ser. No. 842,892, Oct. 17, 1977, abandoned.

[51] Int. Cl.³ ................... B01D 23/02; B01D 29/08
[52] U.S. Cl. ................... 210/221.1; 210/236; 210/350; 210/496; 210/924; 264/321
[58] Field of Search ............ 210/30 A, 242 AS, 496, 210/DIG. 26, 221.1, 236, 350, 924; 264/37, 128, DIG. 7, 321

[56] References Cited

U.S. PATENT DOCUMENTS

| | | | |
|---|---|---|---|
| 1,045,234 | 11/1912 | Willis et al. | 264/321 X |
| 2,117,273 | 5/1938 | Brown | 210/DIG. 26 |
| 2,744,291 | 5/1956 | Stastny et al. | 264/DIG. 7 |
| 3,004,293 | 10/1961 | Kreidl | 264/DIG. 7 |
| 3,329,306 | 7/1967 | Stein | 264/DIG. 7 |
| 3,354,578 | 11/1967 | Ryan | 264/DIG. 7 |
| 3,401,128 | 9/1968 | Terry | 264/321 X |
| 3,403,203 | 9/1968 | Schirmer | 264/321 X |
| 3,598,729 | 8/1971 | Baumann | 210/DIG. 26 |
| 3,617,551 | 11/1971 | Johnston et al. | 210/DIG. 26 |
| 3,617,566 | 11/1971 | Oshima et al. | 210/DIG. 26 |
| 3,681,237 | 8/1972 | Orban et al. | 210/30 A |
| 3,756,948 | 9/1973 | Weinberg | 210/DIG. 26 |
| 3,794,583 | 2/1974 | Rhodes | 210/DIG. 26 |
| 4,059,528 | 11/1977 | Grosshandler | 210/DIG. 26 |

FOREIGN PATENT DOCUMENTS 1337413 11/1973 United Kingdom ............ 264/DIG. 7

Primary Examiner—Robert H. Spitzer
Attorney, Agent, or Firm—Burns, Doane, Swecker & Mathis

[57] ABSTRACT

A filter apparatus for separating particles of oil from waste water comprises a housing having an inlet and an outlet and a filter element arranged therebetween. The filter element is in the form of a self-supporting body comprising small pieces of soft foamed plastic material having open cells. The foamed plastic material has been subjected to mechanical, non-disintegrating pressure shocks of a magnitude sufficient to rupture the cell walls. Thereafter the pieces are joined together under pressure by means of a bonding agent.

5 Claims, 4 Drawing Figures

FILTER MEANS

This is a continuation of Application Ser. No. 13,533 filed Feb. 21, 1979, which is a continuation of the parent U.S. Application Ser. No. 842,892 filed Oct. 17, 1977, by the present inventor, both applications abandoned.

The present invention relates to a filter means for separating oil-products from waste water containing such products, said filter means comprising a housing having an inlet and an outlet and at least one filter element arranged between said inlet and said outlet. By oil-products is meant here all kinds of petroleum products.

Such filter means are not suffiently effective to separate oil-products from waste water, since after the filter has been in use for some time, oil-particles migrate through the filter and pass to the outlet of the filter housing. Because of this, it has become a practice to strew different kinds of absorbent material, such as foamed plastics, on the surface of the waste water containing oil-particles so that the foamed plastics absorbs the oil floating on the surface of said water. Although a large percentage of the oil present is absorbed by the foamed plastics, the method can be mainly used only on the floors of work hops and like floors which become soiled with oil, and under no circumstances is it possible to remove all the minute particles of oil which are suspended in the waste water and which thus ultimately reach a sewage system coupled to a purification plant operating in accordance with the biological purification techniques. If oil-containing water enters the biological purification stage of a sewage plant, the micro organisms will be destroyed causing the biological decomposition of organic material to be impaired.

Neither can the known filter means be used effectively to purify waste water obtained when flushing the tanks of ships, since it is not practically possible in this respect to treat the water with an oil-absorbing material, and consequently after the conventional filter means has been used for some time, the water discharged to the sea will contain large quantities of oil.

Consequently a principle object of the invention is to provide a filter means having one or more filter elements for capturing and retaining oil particles contained in the waste water passing through said filter means and which is of such character that oil displaces the water in the filter material, it being possible to practically saturate the filter material with oil without oil passing to the outlet of the filter means.

This object is realised in accordance with the invention by the fact that the filter element comprises a self-supporting body comprising small pieces of a soft foamed plastics material having open cells which has been subjected to mechanical, non-disintegrating pressure waves to rupture the cell walls, whereafter the pieces of foamed plastics are joined together under pressure with the aid of an adhesive.

Filter elements comprising minute pieces of foamed plastics in accordance with the above have surprisingly been found capable of absorbing approximately 95% by volume of oil without risk of the oil leaving the foamed-plastics body even when the oil is subjected to pressure from the water flowing through said body. This completely unexpected effect cannot be fully explained, although it is thought to be due to the fact that the mechanical shock-like pressure-treatment to which the soft foam plastics is subjected give rise to the formation of capillaries which become randomly oriented in the finished foam-plastics body. This mechanical shock-like pressure-treatment is preferably carried out at the same time as the foam-plastics block is shreaded into small pieces, each of which has a greatest dimension of preferably 2–7 mm. These capillaries cause the captured oil to be so firmly held that there is no risk of oil migrating out of the filter element. The foamed plastics material, which as beforementioned is a soft material, i.e. a material of the type which can be greatly deformed without beccomming cracked or without being permanently deformed or without disintegrating, comprises, for example, a polyurethane, a polypropane, a polyethylene or a polyether having open cells and the finished filter element should have a bulk density of 40–250 kg/m$^3$.

The invention will now be described with reference to the accompanying drawings.

Figure 2:
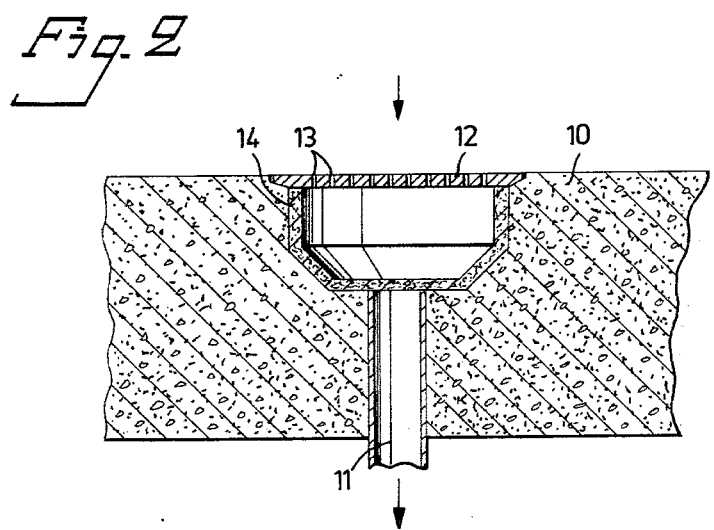
Figure 3:
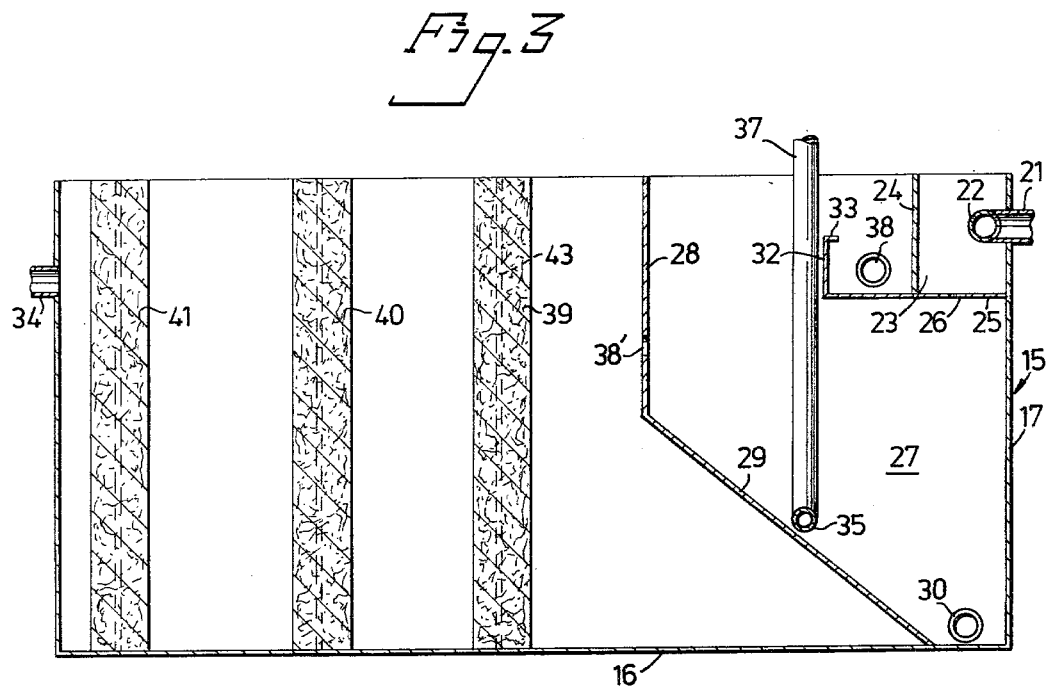
Figure 4:
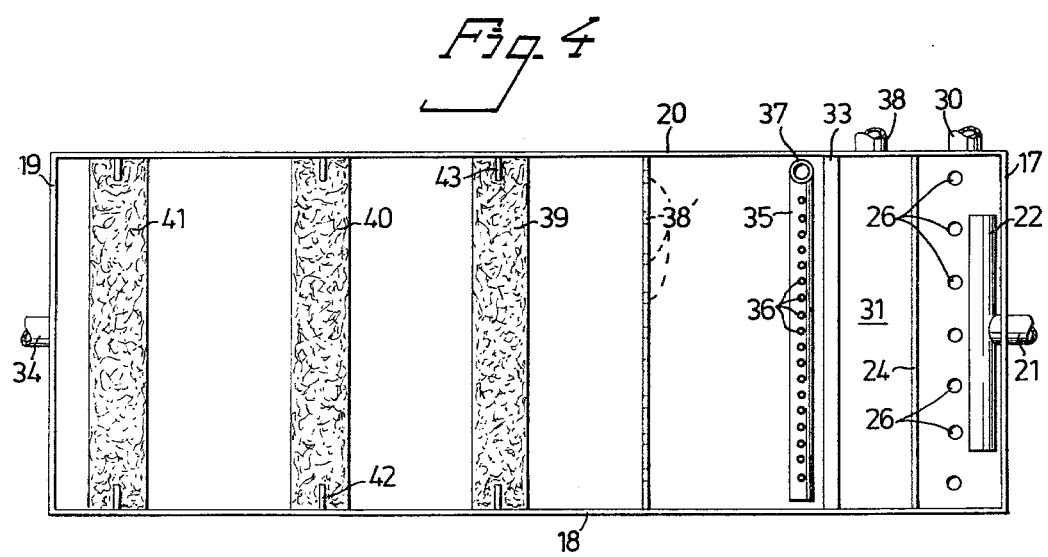

FIG. 1 is a vertical sectional view of a first filter means according to the invention, FIG. 2 is a vertical sectional view of a second filter means according to the invention, FIG. 3 is a vertical sectional view of a third filter means according to the invention, and FIG. 4 is a plan view of the filter means shown in FIG. 3.

In FIG. 1 there is shown a filter housing having the form of a drain arranged in a floor, said drain being sealed and provided with a lid 2. Connected to the housing 1 is an inlet pipe 3 for oil-contaminated water, and an outlet pipe 4. Arranged between the inlet pipe 3 and the outlet pipe 4 is a filter 5 constructed in accordance with the invention. This filter element 5 comprises a self-supporting body manufactured from small pieces of soft foamed plastics material having open cells and being of the kind mentioned in the introduction. The starting material comprises blocks of foamed plastics material or large pieces of such material and is conveniently shredded in a granulating mill having rotary knives for cutting the pieces of plastics material to a suitable size. The small pieces of plastics material are then conveniently subjected to the aforementioned pressure-treatment in a hammer mill. The foamed plastics material may also be subjected to said pressure-treatment in a shredder having teeth which subject the plastics material to pressure pulses or impacts sufficient to rupture the cell walls at the same time as the plastics material is shredded into smaller pieces. It is also possible to first subject the starting material, e.g. blocks of foamed plastics material, to pressure impulses or impacts and then shred said blocks into the required size. It is preferred however, that the material is subjected to said pressure-treatment at the same time as it is shredded.

The resulting small pieces of foamed plastics material, which may be optionally treated with a hydrofobic substance, are then formed into bodies of desired shape and size by providing at least parts of the surfaces of the foamed plastics pieces with a hardening and preferably foaming binding agent, whereafter the foamed-plastics bodies are subjected to a pressure of 0.01–0.4 kg/cm$^3$ during the hardening process. The binding agent conveniently comprises the same raw material as the plastics body in general. The plastics bodies are either formed initially as filter elements or are cut or sawed to the intended shape and size.

In the FIG. 1 embodiment, the housing 1 is assumed to be cylindrical and the filter element 5 comprises a cylindrical, plate-like body. Arranged in the interior of the housing 1, on the wall 7, and extending between the inlet 3 and the outlet 4 is a circular bar 6 which is provided with a lower circular flange 8 on which a net 9 rests, said net forming a support for the filter element 5. The net can be omitted if the element 5 is made sufficiently thick. Medium flowing in through the inlet 3 will thus pass though the filter element 5 and through the net or grid 9 to the outlet 4, and particles of oil or emulsion suspended in said medium will remain in the plastics material of the filter element 5 while water or air will pass through the outlet 4. Subsequent to the filter element 5 having absorbed oil to about 95% by volume of said element, the element 5 is exchanged for a further element.

In FIG. 2 there is shown a further embodiment in which the housing is formed by a recess in a floor 10, said recess being connected to an outlet 11 passing through the floor 10. The inlet is formed by a plate 12 provided with through-passing holes 13 to enable oil-containing water present on the floor to run down into the recess or drain in the floor. Arranged in the recess is a cup-shaped filter element 14 of the same plastics material as the previously described filter element 5. Water contaminated with oil or oil-emulsions will thus collect in the cup-shaped filter element 14 and water flows through the element out through the outlet 11, whilst the emulsions or oil are absorbed in the filter element. Subsequent to the filter element having absorbed the maximum amount of oil, which reaches to approximately 95% by volume calculated on the volume of the filter, the cup-shaped filter element 14 is removed and a further element inserted.

FIGS. 3 and 4 illustrate a further embodiment of the invention and are particularly intended, although not exclusively, for use in large filter means which receive large quantities of contaminated waste water containing large particles of metal, wire and the like and large clumps of oil.

The filter means comprises a liquid-tight housing 15, manufactured for example of sheet steel. The housing has a bottom 16 and side walls 17, 18, 19 and 20 extending outwardly from said bottom. In the illustrated embodiment the filter housing is open upwardly although it may also be provided with a tightly fitting lid. Connected to the wall 17 is a waste-water inlet 21 which is connected to a broad nozzle 22 in the form of a pipe having open ends. The nozzle 22 is arranged in a chamber 23 defined by parts of the walls 17, 18 and 20 and by a wall 24 extending between the walls 18 and 20, and by a bottom 25. Arranged in the bottom 25 of the chamber 23 are a plurality of through-openings 26 through which heavy particles, such as pieces of metal, may fall onto the bottom of a separating chamber 27. The separating chamber 27 is defined by a part of the bottom 16, parts of the walls 17, 18 and 20 and by a wall 28 having a bottom 29 sloping downwardly towards the wall 17. Heavier particles in the waste water will sink to the bottom of the separating chamber 27 and can be removed therefrom through a pipe 30 connected to the bottom portion of the chamber 27. Connected to the forward, substantially vertical wall 24 of the chamber 23 is a chute 31 formed by an extension of the bottom plate 25 and an edge plate 32 having an edge portion 33 bent in towards the wall 24. When the filter is in use, this edge portion 33 lies on a level with an oultet 34 from the housing. The ends of the chute 31 are sealingly connected to the side walls 18 and 20.

Arranged in the lower portion of the separating chamber 27 is an air-injection nozzle 35 which in the illustrated embodiment comprises a pipe having a plurality of air-injection orifices 36. The pipe 35 extends substantially over the whole width of the housing 15 and air under pressure is supplied to the pipe from a supply line 37 connected to one end of the pipe 35, as shown in FIG. 4. The other end of the supply line 37 is connected to a compressor (not shown). The pipe 35, whose end remote from the supply line 37 is closed, extends substantially parallel with the straight overflow edge 33 and at a small horizontal distance in front of said edge. When air is supplied to the nozzle or the pipe 35, the upwardly rising air stream will entrain with it large clumps of oil and move these clumps over the edge 33. The clumps of oil are collected in the chute and subsequently depart therefrom through an outlet 38. There is no risk of such oil clumps passing the air-bubble curtain formed by means of the pipe 35, and consequently waste water containing only minor particles of oil will flow towards the wall 28 and out through outlet openings 38'. Arranged between the outlet 34 and the separation chamber 27 is a plurality of filters 39, 40 and 41 of the type aforedescribed.

In the illustrated embodiment, each filter 39, 40, 41 comprises a rectangular sheet of foamed plastics material of the described type which sealingly abuts the bottom 16 and the side walls 18 and 20 respectively. The walls 18 and 20 have fixed thereto flanges 42 and 43 for respective filter element and grooves are arranged in the edges of associated filter elements to enable each element to be pushed down against the bottom of the housing with the flanges sliding in said groove.

This greatly facilitates the removal of a saturated filter element. The oil can be readily removed from said saturated filter element by squeezing the same in a press or the like, whereafter the filter element can be reused.

I claim:

1. A filter means for separating particles of oil from waste water, said means comprising a housing having an inlet and an outlet and at least one filter element arranged between said inlet and said outlet, characterized in that the filter element comprises a self-supporting body comprising small pieces of a soft foamed plastics material having open cells, which material has been chopped and been subjected to mechanical non-distintegrating pressure shocks of a magnitude sufficient to rupture a substantial portion of the cell walls, whereafter the pieces of foamed plastics material have been joined together under pressure by means of a binding agent, said filter element having a bulk density of from 40 to 250 kg/m$^3$.

2. A filter means according to claim 1, characterised in that the filter body is cup-shaped.

3. A filter means according to claim 1, characterised in that the housing is of substantially rectangular cross-section in the direction of medium flow and has guide rails arranged on two mutually opposing walls, said guide rails being arranged to engage in grooves in the edge portions of the filter element adjacent respective walls.

4. A filter means according to claim 1, characterized in that arranged between the inlet and the filter element is a separation chamber for separating coarse particles from the waste water.

5. A filter means according to claim 4, characterized in that arranged in the upper portion of the separation chamber is an upwardly open chute having a substantially horizontal edge located beneath the normal liquid-level in the housing; said edge being located above a major flow path of water from said inlet to said outlet; discharge means connected to said chute and discharging externally of the housing; and an air-injection means arranged in the lower portion of the separation chamber, said air-injection means being arranged to form an air-bubble curtain between the inlet and the discharge means to move clumps of oil present in the waste water out of said major flow path and up to said edge of said chute.

* * * * *